United States Patent [19]

Fox

[11] 4,136,209
[45] Jan. 23, 1979

[54] PROCESS FOR THE PRODUCTION OF A PECTIN PREPARATION AND FOR THE PRODUCTION OF A FOOD-GRADE GELLING AGENT AND THE GELLING AGENT PREPARED THEREFROM

[75] Inventor: Gerhard Fox, Neuenbürg, Fed. Rep. of Germany

[73] Assignee: Pektin-Fabrik Hermann Herbstreith KG, Neuenbürg, Fed. Rep. of Germany

[21] Appl. No.: 881,813

[22] Filed: Feb. 27, 1978

[30] Foreign Application Priority Data

Feb. 26, 1977 [DE] Fed. Rep. of Germany ....... 2708404

[51] Int. Cl.² ........................... A23L 1/06; A23L 1/04
[52] U.S. Cl. ..................................... 426/577; 426/658
[58] Field of Search ................................ 426/577, 573

[56] References Cited

U.S. PATENT DOCUMENTS

| | | | |
|---|---|---|---|
| 2,373,729 | 4/1945 | Willaman | 426/577 |
| 2,421,093 | 5/1947 | Thompson | 426/577 |
| 2,703,759 | 3/1955 | Leo et al. | 426/577 |
| 2,801,178 | 7/1957 | Leo et al. | 426/577 |
| 3,065,081 | 11/1962 | Leo et al. | 426/577 |
| 3,892,870 | 7/1975 | Wood | 426/577 |

*Primary Examiner*—Jeanette M. Hunter
*Attorney, Agent, or Firm*—Toren, McGeady and Stanger

[57] ABSTRACT

A method for the production of a pectin preparation wherein fruit pectin having a metal binding power of 30 to 140 g of metal salt is dissolved with a phosphate to produce a solution having a pH between 4.4 to 4.8 and wherein the soluble metal salt is added to the solution in a stoichiometric amount of 30 to 140 g calculated as calcium chloride per kg of pectin and then precipitating the pectin from the solution. The preparation thus prepared has good solubility in cold and warm water and forms a low viscosity solution which is easy to work with. The nature of the preparation as well as gelling agents prepared therefrom are disclosed.

22 Claims, No Drawings

PROCESS FOR THE PRODUCTION OF A PECTIN PREPARATION AND FOR THE PRODUCTION OF A FOOD-GRADE GELLING AGENT AND THE GELLING AGENT PREPARED THEREFROM

BACKGROUND OF THE INVENTION

1. Field of the Invention

The invention relates to a process for the production of a pectin preparation, and particularly of fruit pectin, e.g., apple pectin, which is suitable for the production of jellies with a particularly low solids content.

2. Description of the Prior Art

Highly esterified pectins form jelly, in which the gel formation is based on a dehydration and electrical neutralization of colloidally dispersed and hydrated pectin agglomerates. In addition, sugar or a sugar substitute material must be present as a dehydration agent at a concentration of almost 65%, and the required pH value must be maintained within a narrow tolerance range. The individual pectin molecules are, at the same time, linked by hydrogen bonds, which are formed with the sugar.

Partially esterified pectins, i.e., pectins with a degree of esterification less than 50%, have gelling or thickening properties which are similar to those of agar or gelatin. Partially esterified pectins are used in the food industry, for example, for the production of low solids jellies, milk puddings and sugar-free jellies.

The gelling property of partially esterified pectins depends upon the amount of pectin, the solid content, the pH value and the buffer salt content and on the amount of calcium ion present. Moreover, the calcium ion concentration plays a significant role in which the optimum amount of calcium ion changes as a function of the degree of esterification. The optimum calcium content, expressed in mg Ca/g of pectin, which forms a solid gel, is a defined quantity for a particular pectin. If this calcium concentration is exceeded, a brittle gel results with a strong tendency towards syneresis. At the same time, the dependence on the pH value and the solids content plays only a subordinate role. For the technological application of these pectins, the following factors are, however, unfavorable:

1. the lower the degree of esterification of a pectin, the less is its solubility in water;
2. for maintaining an optimum calcium ion concentration, an addition of calcium is usually necessary. This addition depends on the water used and on the fruit.

SUMMARY OF THE INVENTION

We have discovered a method for making a pectin preparation on the basis of partially esterified pectin with an amount of calcium that is optimum for its degree of esterifications in a manner that a sufficient amount of buffer salt is simultaneously present in order to keep this pectin in aqueous solution.

It is noted that when referring to calcium herein, it is also considered to be representative of other comparable materials, such as, for example, magnesium or the like.

More particularly, the inventive process comprises the following steps:

a. a pectin is used as a starting material, which has a metal binding power of 30 to 140 g of metal salt, calculated as $CaCl_2$, per kg of pectin with a degree of esterification of 30 to 40%, preferably 35 to 38%, b. at a temperature between 10° and 90° C., a solution is prepared from this pectin, water and a phosphate selected from the group consisting of orthophosphates, pyrophosphates, and polyphosphates, and preferably sodium pyrophosphate, so that a pH value between 4.4 and 4.8 is obtained, c. a certain amount of soluble calcium, magnesium, aluminum or iron salts or mixtures of these salts are added in dry or dissolved form to the solution with stirring, the amount corresponding stoichiometrically to an amount of 30 to 140 g or $CaCl_2$/kg of pectin, and d. the pectin preparation thus formed is precipitated from the solution and dried.

DESCRIPTION OF THE PREFERRED EMBODIMENTS

As phosphate, orthophosphates, polyphosphates, and pyrophosphates, such as sodium phosphate, and preferably tetrasodium pyrophosphate, are suitable for use.

By using the inventive process, a pectin preparation can be obtained by reacting partially esterified pectin with certain phosphates under given reaction conditions and at a given pH value. The prepared pectin phosphate compound is caused to react with calcium iron, whereby, after precipitation, a phosphated Ca-pectin is obtained which may be described as calcium phospho-pectin. It may be assumed that in this calcium phospho-pectin, the greater portion of the calcium is not bound directly to pectin but rather, is linked via the phosphate group with the pectin.

In technical applications, the calcium phospho-pectin produced with the process of the present invention exhibits the following advantageous properties.

The solubility in cold and warm water is good and it forms a solution of relatively low viscosity, which is easy to work with. On adjusting the pH to a certain value during the cooking, the calcium phosphate group splits off from the pectin. At the same time, the original partially esterified pectin is reformed and is then present in a defined concentration of calcium and buffer. Moreover, the reaction of pectin with calcium takes place slowly and a uniform calcium pectinate gel is formed. Although there continues to be a dependence on the pH value, the pH range may be significantly greater than in the case of highly esterified pectins. The calcium sensitivity, i.e., the dependence on the fruit or the surrounding medium, is slight. The inventively produced pectin preparation is similar to amidized pectin in regard to the calcium and pH dependence. However, in the case of the inventive calcium phospho-pectin, the optimum amount of calcium is already incorporated therein.

The following example illustrates the present invention:

A partially esterified pectin, with a degree of esterification of 30 to 40%, especially of 35 to 38%, is used as the starting pectin.

Determination of Amount of Calcium to be Added

In order to determine the necessary calcium chloride requirement, cooks are prepared with increasing amounts of calcium chloride. The following formulation is used as basic cook (example):

500 g Strawberry pulp
500 g Partially esterified pectin solution, 2.5% concentration (= 12.5 pectin)
650 g Fructose syrup, 70% concentration ca. 3 ml of 50% citric acid for adjusting the pH value to 2.9.

By cooking to a solid content of 50%, a 1 kg cook is obtained.

Increasing amounts of a 2% CaCl$_2$ solution are added to 100 g samples of this cook. The calcium chloride solution is stirred into this cook immediately after it is poured out and while it is still very hot. These samples are set aside to cool and gel.

As a rule, an addition of ca. 2 to 7 ml of CaCl$_2$ solution is adequate. A 2% solution of anhydrous CaCl$_2$ is used. The consistency of the cook was used as a measure of the amount of CaCl$_2$ required. In the series of increasing strength, the sample with the best gel strength, immediately preceding the sample which begins to be gritty, was evaluated in the calculation. In so doing, an addition of each 1 ml CaCl$_2$ solution (2%) to 100 g of the cook containing 1.2% of partially esterified pectin, corresponds to a later dosage of 16.67 g of CaCl$_2$ (anhydrous)/kg of pectin. A calcium dosage of 6 ml to 100 g of cook corresponds, for example, to a later weighed-in quantity of 100 g of CaCl$_2$ for each 1 kg of partially esterified pectin.

A 30 kg Charge of Pectin Was Used as Example

A receptacle was filled with 1,200 l of water at a temperature of 50° to 60° C. Into this water, 30 kg of the above defined starting pectin were weighed-in while stirring rapidly. Subsequently, 16.0 kg of tetrasodium pyrophosphate decahydrate (Na$_4$P$_2$O$_7$.10H$_2$O) in solid form were added in order to obtain a pH value of 4.4 to 4.8 in the solution. After the addition of pyrophosphate, stirring was continued for about a further 15 minutes at a reduced speed, until the pectin was completely dissolved.

The dosage of sodium pyrophosphate should not be higher at this time, since reactions could occur which might have an undesirable effect on the final quality. Alternatively, the possibility exists of adding the sodium pyrophosphate first to the water and then the pectin or of adding both materials together.

Subsequently, the calculated amount of food-grade quality CaCl$_2$ with a degree of purity of 96% is added in the form of a 10% solution, preferably through an injector, while stirring rapidly. Intensive stirring is necessary in order to achieve a rapid and good distribution of CaCl$_2$. After addition of the CaCl$_2$, rapid stirring must be continued for a period (generally about 5 minutes), in order to ensure an optimum reaction.

The CaCl$_2$ addition should be carried out in such a manner, that pectinate formation is avoided. In place of calcium chloride, other soluble calcium salts and/or magnesium salts, aluminum or iron salts or mixtures of these may also be added. On the whole, salts of multivalent metal ions may be added which meet the requirements for food-grade additives.

A further amount of pyrophosphate is added subsequently. This amount is determined by testing a sample in the laboratory for its pH value and its viscosity. The pH value should be adjusted to 5.0 ± 0.2. The viscosity is, however, a better criteria and viscosities between 30 to 35 cP at 20° C. (measured at 2,770 sec$^{-1}$) are acceptable). Higher viscosities should not be accepted. Viscosity measurements were carried out on a Rotovisco at n = 512 rpm with decreasing frequency of rotation, 100 S calibration with NV measuring equipment. Stirring is also rapid during this addition of pyrophosphate, which is in solid form.

After this amount of pyrophosphate has been dissolved, the pH value and viscosity of the solution are checked once again.

Possible corrections can be carried out even after these stop. Since all of these measurements are carried out on a solution of 30 kg of partially esterified pectin in 1,200 l of water (= 2.5%), other test data must be used as a basis when working with solutions of different concentration. Viscosity and pH value measurements will then be redefined.

Accordingly, it is possible to work with higher concentrations of pectin for which, for example, 30 kg of pectin may be mixed into 700 to 800 l water. For the subsequent precipitation, it is advantageous to select a concentration higher than 2.5%, for example, a 5% pectin solution.

If the laboratory finding for the solution of the pectin preparation is positive, the solution is precipitated by the well-known procedure in alcohol.

After the precipitation is completed, the precipitation is squeezed-out using an extrusion press.

The squeezed-out pectin preparation is dried in a stream of air heated to not more than 60° C. Subsequently, the preparation is ground in the usual manner.

The calcium phospho-pectin thus obtained has the advantageous properties described hereinabove.

In addition, experiments were carried out in order to test the dependence of gelling on the initial pH value of the pectin preparation. In so doing, it has turned out that, for a pH value of ca. 5.0, gelling is best for the defined CaCl$_2$ content. If the 2.5% solution of pectin preparation has a pH value greater than 5.0, the gelling power of the sample cook becomes worse with increasing pH value of the initial solution. The pH value in the sample cook is constant between 2.9 and 3.0. This experiment is intended to show that the gelling ability decreases at pH value above 5.0 in the pectin solution. The viscosity of solutions with a pH value of 5.0 is very low. In any case, a low pH value or a high viscosity of the solution is of advantage, since the deposition of calcium takes place less readily. A sufficient phosphating of the preparation nevertheless remains ensured.

When using most of the gelling agents presently commercially available, for example, for the preparation of milk or fruit desserts, it is necessary to dissolve the gelling agent with boiling in water and/or possibly to prepare the gelling agent for gel formation by the addition of, for example, citric acid or the like.

it is therefore a further object of the invention to provide a food-grade gelling agent, which may be used directly as a solid gelling agent without any preliminary preparative steps.

In order to accomplish this purpose, the present process for the production of a food-grade gelling agent comprises bringing 1 to 4 weight percent of a calcium phospho-pectin on the basis of pectin, prepared as above, and especially apple pectin, into solution with stirring in 20 to 80 weight percent of water. In this solution, 20 to 80 weight percent of a filler, on the basis of sugar or sugar substitute materials, are subsequently dissolved.

Thus, in the gelling agent of the present invention, 20 to 80 weight percent of a filler, on the basis of sugar or sugar substitute materials, are added to this solution.

Based on the excellent gelling ability of the above described pectin preparation (referred to as NV-50 in the following), which represents a calcium phospho-pectin obtained from fruit pectin, a process has been developed which permits a food-grade jelly to be produced in a simple manner by mixing the inventive gelling agent at normal temperatures with approximately an equal volume of fruits (fresh, frozen or from cans), fruit juices, milk, milk products and sour milk products. The inventive food-grade gelling agent is prepared as follows:

1 to 4% of NV-50 are brought into solution in water and the solution is brought to a solids content of 20 to 80% by additionally dissolving a filler.

As a filler, sugars and sugar substitute materials, such as, for example, sucrose, invert sugar, sorbitol, fructose, xylitol, starch syrup, etc., are suitable. In both the production and the processing of the liquid gelling material, one can operate without the addition of acids or calcium salts, the natural acid or calcium iron content of the foods used being sufficient for gelling.

At the same time, attention must be paid to maintaining a solids content that delays or avoids the perishability of the product and/or maintain sterile working conditions (sterile filling at temperatures higher than 70° C.) and/or to assuming that the solution is preserved by additives.

As example of the preparation of the liquid jelly (that is to be poured) or of the gelling agent is as follows: For a 2% solution of NV-50 in a 50% solids solution with sugar using hot filling, 2 kg pectin NV-50 are added to 50 kg water at a temperature of 40° to 100° C. with rapid stirring. Stirring must be continued for a brief time until the pectin is fully dissolved. To this solution, 40 kg of sugar are added with further stirring until the sugar is completely dissolved. Subsequently, the product is bottled while maintaining the above-mentioned conditions to avoid microbial spoilage. The pH value of the liquid jelly, prepared according to this process, must be between 3.8 and 5.2 before pouring, so that gelling of the liquid jelly is prevented.

If necessary, the pH must be corrected by the addition of appropriate additives. In the above example, a pH value of 4.8 proved to be most favorable (adjustment was made with tetrasodium pyrophosphate).

The following possibilities are mentioned as examples of use:

Preparation of a Milk Dessert or of a Sour Milk Dessert

To a selected volume of pourable liquid jelly (100 ml.) approximately the same volume (50 to 200 ml.) of fresh milk, H-milk or a sour milk product available in the market, such as, curds or yogurt, are stirred in and allowed to stand for a brief period for the development of the final consistency.

Fruit Dessert

To a selected volume (100 ml.) of pourable liquid jelly, approximately the same volume (50 to 200 ml.) of prepared fresh fruit (strained or in small pieces), defrosted frozen fruit, fruit from cans or fruit juices of any kind are added with stirring and allowed to stand for a brief period for the development of the final consistency.

The fruity taste of the dessert may be improved by the addition of a certain amount of fruit acid or citric acid to the fruit or the fruit juice. At the same time, however, care must be taken that this does not cause a more rapid gelling or an increase in the gel strength.

Preparation of Jelly Material and Jelly Topping for Fancy Cakes

The preparation proceeds in the same manner as for the described fruit desserts. After stirring in the pourable liquid jelly into the fruit or into the juice, the material, before it gels, is distributed over the cake layer or poured on after the take-off process.

What is claimed is:

1. A process for the production of a pectin preparation based on fruit pectin suitable for the production of jellies with a low solids content comprising:
    (a) preparing a solution of a pectin which has a metal binding power of 30–140 g of metal salt, calculated as $CaCl_2$, per kilogram of pectin with a degree of esterification of 30–40%, with water and a phosphate selected from the group consisting of orthophosphates, pyrophosphates, and polyphosphates at a temperature between 10° and 90° C. to obtain a pH value between 4.4 and 4.8;
    (b) adding a salt of a metal selected from the group consisting of soluble calcium, magnesium, aluminum, iron and mixtures thereof in dry or dissolved form to the solution with stirring, the amount of the salt corresponding stoichiometrically to 30 to 140 g of $CaCl_2$/kg of pectin, and
    (c) precipitating the pectin preparation formed from the solution and drying the precipitate.

2. The process of claim 1, wherein the degree of esterification of the pectin is from 35 to 38%.

3. The process of claim 1 wherein the phosphate is sodium pyrophosphate.

4. The process of claim 1 wherein after the addition of metal salt, a further amount of phosphate is mixed in with the solution in order to obtain a pH value of 4.4 to 5.5, measured at a concentration of 5% of the pectin.

5. The process of claim 1 wherein after the addition of the metal salt, a further amount of phosphate is mixed in with the solution in order to adjust the viscosity to 30–35 milli Pascal seconds, measured at 20° C. and a shear velocity of 2,770 $sec^{-1}$ at a concentration of 5%.

6. The process of claim 1 wherein the pectin is precipitated with alcohol.

7. The process of claim 1 wherein the precipitated pectin preparation is squeezed from the solution by means of an extrusion press.

8. The process of claim 7 wherein the squeezed-out pectin preparation is dried at a temperature not exceeding 60° C.

9. A process for the production of a food-grade gelling agent, comprising dissolving 1 to 4 weight percent of a calcium phospho-pectin on the basis of pectin with stirring in 20 to 80 weight percent of water.

10. The process of claim 9 wherein calcium phosphate pectin is prepared from apple pectin.

11. The process of claim 9 wherein 20 to 80 weight percent of a filler selected from the group consisting of sugar and sugar substitutes are dissolved in the solution.

12. The process of claim 11 wherein two parts by weight of calcium phospho-pectin are brought into solution in 50 parts by weight of water and subsequently dissolving 50 parts by weight of filler therein.

13. The process of claim 11 wherein the filler is sucrose, invert sugar, sorbitol, fructose, xylitol, or starch syrup.

14. The process of claim 9 wherein the pH of the solution is maintained between 3.8 and 5.2.

15. The process of claim 14 wherein the pH of the solution is maintained between 3.8 and 5.2 by the addition of tetrasodium pyrophosphate.

16. The process of claim 15 wherein the pH of the solution is maintained at 4.8.

17. A food-grade gelling agent comprising 1 to 4 weight percent of a calcium phospho-pectin preparation and 20 to 80 weight percent of a filler selected from the group consisting of sugar and sugar substitute materials.

18. The gelling agent of claim 17 wherein the pectin is based on fruit pectin.

19. The gelling agent of claim 17 which contains two parts by weight of the pectin preparation, 50 parts by weight of water and 48 parts by weight of a filler.

20. The gelling agent of claim 17 which has a pH value from 3.8 to 5.2.

21. The gelling agent of claim 20 wherein the pH is 4.8.

22. The gelling agent of claim 20 wherein the pH value is adjusted by the addition of tetrasodium pyrophosphate.

* * * * *